B. C. WHITE.
NUT LOCK.
APPLICATION FILED SEPT. 25, 1911.

1,058,124.

Patented Apr. 8, 1913.

WITNESSES:

INVENTOR
B. C. White.
BY
ATTORNEYS

UNITED STATES PATENT OFFICE.

BEN CALVIN WHITE, OF SHINNSTON, WEST VIRGINIA.

NUT-LOCK.

1,058,124.  Specification of Letters Patent.  Patented Apr. 8, 1913.

Application filed September 25, 1911. Serial No. 651,241.

*To all whom it may concern:*

Be it known that I, BEN C. WHITE, a citizen of the United States, residing at Shinnston, in the county of Harrison and State of West Virginia, have invented certain new and useful Improvements in Nut-Locks, of which the following is a specification.

This invention relates to that class of nut-locks in which the nut is locked on the bolt by means of a pawl carried by the nut and engageable with a longitudinal groove in the bolt.

It is the object of the invention to provide a locking device of this kind which can be readily applied and removed, and which is simple in construction and efficient in operation.

Figure 1:
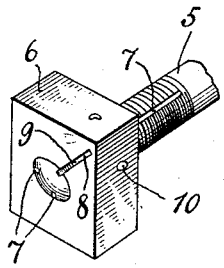
Figure 2:
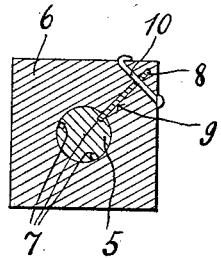

In the accompanying drawing, Figure 1 is a perspective view of a nut and bolt equipped with the locking device which is the subject of the present invention. Fig. 2 is a cross section taken through the locking device.

Referring specifically to the drawing, 5 denotes a bolt on the threaded portion of which is screwed a nut 6. The bolt has a number of longitudinal grooves 7 in a selected one of which is adapted to be slipped a pawl 8 carried by the nut. The pawl seats in a radial slot 9 made in the nut, said slot extending through the nut from a point close to one of its corners to the bolt hole. By thus locating the slot it is possible to provide a simple support for the pawl, said support being a pin 10 which is passed across the corner of the nut so as to intersect the slot, the nut having an aperture which extends from one side thereof to the adjacent side, at the corner of the nut. The aperture intersects the slot and the pin passes therethrough and through an aperture in the pawl.

In operation, the nut is screwed on the bolt as usual, and after it is screwed up to its proper place, the pawl 8 is inserted in the slot 9 and fastened by the pin 10, the nut being first adjusted so that the pawl may enter one of the grooves 7. Inasmuch as several grooves are provided, a slight turn of the nut will locate the pawl so as to enter one of them. One end of the pin is bent to prevent it from slipping out of place. The nut is now securely locked, and if it is desired to remove the same, it is necessary only to remove the pin, and thus release the pawl, which latter can then be slipped out of the slot, whereupon the nut is unlocked and it may then be turned off the bolt as usual.

The device is simple and can be easily and cheaply made, and no specially constructed nut or bolt is required, no change in the structure thereof being necessary except to make the slot, aperture and grooves, and as these parts are small, the nut and bolt are not weakened.

I claim—

The combination with a bolt having a longitudinal groove and a nut screwed on the bolt, said nut having a slot extending radially from the bolt hole in the direction of one of the corners of the nut and terminating short of said corner, said slot being intersected by an aperture extending through the nut from one side thereof to the adjacent side; of a pawl seating in the slot and adapted to enter the groove of the bolt, the length of said pawl being equal to the length of the slot plus the depth of the groove, and a pin passing through the aforesaid aperture and through the pawl.

In testimony whereof I affix my signature in presence of two witnesses.

BEN CALVIN WHITE.

Witnesses:
JOHN C. MINOR,
T. N. MASON.

Copies of this patent may be obtained for five cents each, by addressing the "Commissioner of Patents. Washington, D. C."